United States Patent [19]

Kikuchi

[11] Patent Number: 4,782,803

[45] Date of Patent: Nov. 8, 1988

[54] FUEL INJECTION CONTROL METHOD FOR FUEL INJECTION PUMP

[75] Inventor: Hideya Kikuchi, Higashimatsuyama, Japan

[73] Assignee: Diesel Kiki, Co, Ltd., Tokyo, Japan

[21] Appl. No.: 64,084

[22] Filed: Jun. 18, 1987

[30] Foreign Application Priority Data

Jun. 24, 1986 [JP] Japan .................. 61-147888

[51] Int. Cl.$^4$ ............................ F02M 39/00
[52] U.S. Cl. ................... 123/300; 123/506
[58] Field of Search ........... 123/299, 300, 506, 458, 123/357–359

[56] References Cited

U.S. PATENT DOCUMENTS

| | | | | |
|---|---|---|---|---|
| 4,530,337 | 7/1985 | Laufer | ................. | 123/300 |
| 4,542,725 | 9/1985 | Yasuhara | ................. | 123/299 |
| 4,708,116 | 11/1987 | Gaa | ................. | 123/300 |

FOREIGN PATENT DOCUMENTS

| | | | |
|---|---|---|---|
| 3437053 | 6/1985 | Fed. Rep. of Germany | ...... 123/300 |
| 60-125754 | 7/1985 | Japan . | |
| 0230547 | 11/1985 | Japan | ................. 123/299 |

Primary Examiner—Carl Stuart Miller
Attorney, Agent, or Firm—Frishauf, Holtz, Goodman & Woodward

[57] ABSTRACT

A fuel injection control method for a fuel injection pump having a high pressure chamber in which fuel is pressurized, a low pressure chamber, a communicating passageway connected to the high pressure chamber and the low pressure chamber, and a solenoid valve for selectively opening and closing the communicating passageway. While fuel is pressurized, the solenoid valve is selectively closed and opened, so that the pilot injection and subsequently main injection are carried out. A starting time and a terminating time of pilot injection are determined depending on operating conditions of said engine, and main injection of fuel is started when a predetermined period of time elapses from the terminating time of the pilot injection.

3 Claims, 3 Drawing Sheets

FUEL INJECTION CONTROL METHOD FOR FUEL INJECTION PUMP

BACKGROUND OF THE INVENTION

This invention relates to a method of controlling fuel injection from a fuel injection pump provided in an internal combustion engine, especially a diesel engine, and more particularly to a method of controlling fuel injection from a fuel injection pump in which pilot fuel injection is carried out precedently of main fuel injection.

In the diesel engine, in general, there is produced loud combustion noise due to delayed firing of fuel, particularly markedly when the engine is under a low speed operation or a low load operation.

In reducing such combustion noise, pilot injection (preliminary injection) is known to be effective. The pilot injection is defined as injection of part of the total amount of fuel to be injected which corresponds to an amount of fuel to be consumed in one cycle, precedently of the main injection, whereby the fuel precedently injected undergoes firing to thereby sufficiently increase the temperature of the interior of the engine cylinder. Thereafter, the rest of the fuel is injected (main injection).

Conventionally, Japanese Provisional Patent Publication (Kokai) No. 60-125754 is known to disclose such a fuel injection pump having the above-described function of pilot injection. In this conventional fuel injection pump, a solenoid valve is provided between a high pressure chamber for pressurizing fuel to be pressure delivered to injection nozzles and a low pressure chamber for supplying fuel to the high pressure chamber to control overflow of fuel from the high pressure chamber to the low pressure chamber. The solenoid valve is controlled to selectively open and close during pressurizing and pressure delivery of fuel depending on operating conditions of an engine, whereby the supply of fuel to injection nozzles is intermittently carried out for pilot injection and main injection.

However, in the known fuel injection pump, the time actual firing of fuel injected by pilot injection takes place in the cylinder is detected, and the main injection is started when a predetermined period of time has elapsed from the time actual firing of fuel injected by pilot injection takes place as a reference time. The time of firing of fuel injected by pilot injection can vary due to different states of operation of the engine. Accordingly, the starting time of main injection can vary which is set with reference to the actual firing time of fuel injected by pilot injection. In the meanwhile, the time of termination of the main injection cannot be postponed to a time later than the time determined by the construction of the pumping mechanism including a cam disk for driving of the plunger. That is, according to the method of electronically controlling fuel injection, employed by the known fuel injection pump, if the time of firing of fuel injected by pilot injection is delayed, the time of starting of main injection is delayed accordingly, which results in failure in securing a desired time period of main injection. Consequently, the desired amount of fuel injected through main injection, and accordingly, the desired total amount of fuel injected through pilot injection and main injection cannot be obtained, thus making it impossible for the fuel injection pump having the function of pilot injection to carry out stable fuel injection control.

SUMMARY OF THE INVENTION

It is an object of the invention to provide a method of controlling fuel injection which can improve fuel injection controllability of a fuel injection pump having a solenoid valve provided therein for controlling overflow of fuel and having the function of pilot injection.

According to the present invention, there is provided a fuel injection control method for a fuel injection pump having a high pressure chamber being communicatable with fuel injection nozzles of an internal combustion engine, fuel being pressurized in said high pressure chamber and pressurized fuel being pressure delivered therefrom to said fuel injection nozzles, a low pressure chamber, a communicating passageway connected to said high pressure chamber and said low pressure chamber, and a solenoid valve for selectively closing and opening said communicating passageway, wherein while fuel is pressurized in said high pressure chamber, said solenoid valve is selectively closed and opened so that pilot injection and subsequently main injection are carried out. The method according to the invention comprises the following steps:

(1) determining a starting time and a terminating time of pilot injection depending on operating conditions of said engine;

(2) determining a point of time at which a first period of time elapses from the terminating time of said pilot injection as a starting time of said main injection;

(3) determining a point of time at which a second period of time elapses from the starting time of said main injection as a terminating time of said main injection; and, (4) driving said solenoid valve to selectively be closed and opened to control fuel injection from said fuel injection nozzles, in accordance with said starting time and terminating time of said pilot injection which are determined in step (1) and said starting time and terminating time of main injection which are determined respectively in steps (2) and (3).

The above and other objects, features, and advantages of the invention will be more apparent from a reading of the following detailed description taken in connection with the accompanying drawings.

BRIEF DESCRIPTION OF THE DRAWINGS

FIGS. 33a–3d are timing chart showing the operation of a fuel injection pump according to the embodiment of FIG. 2.

DETAILED DESCRIPTION

The invention will now be described in detail with reference to the drawings illustrating a preferred embodiment thereof.

Figure 1:
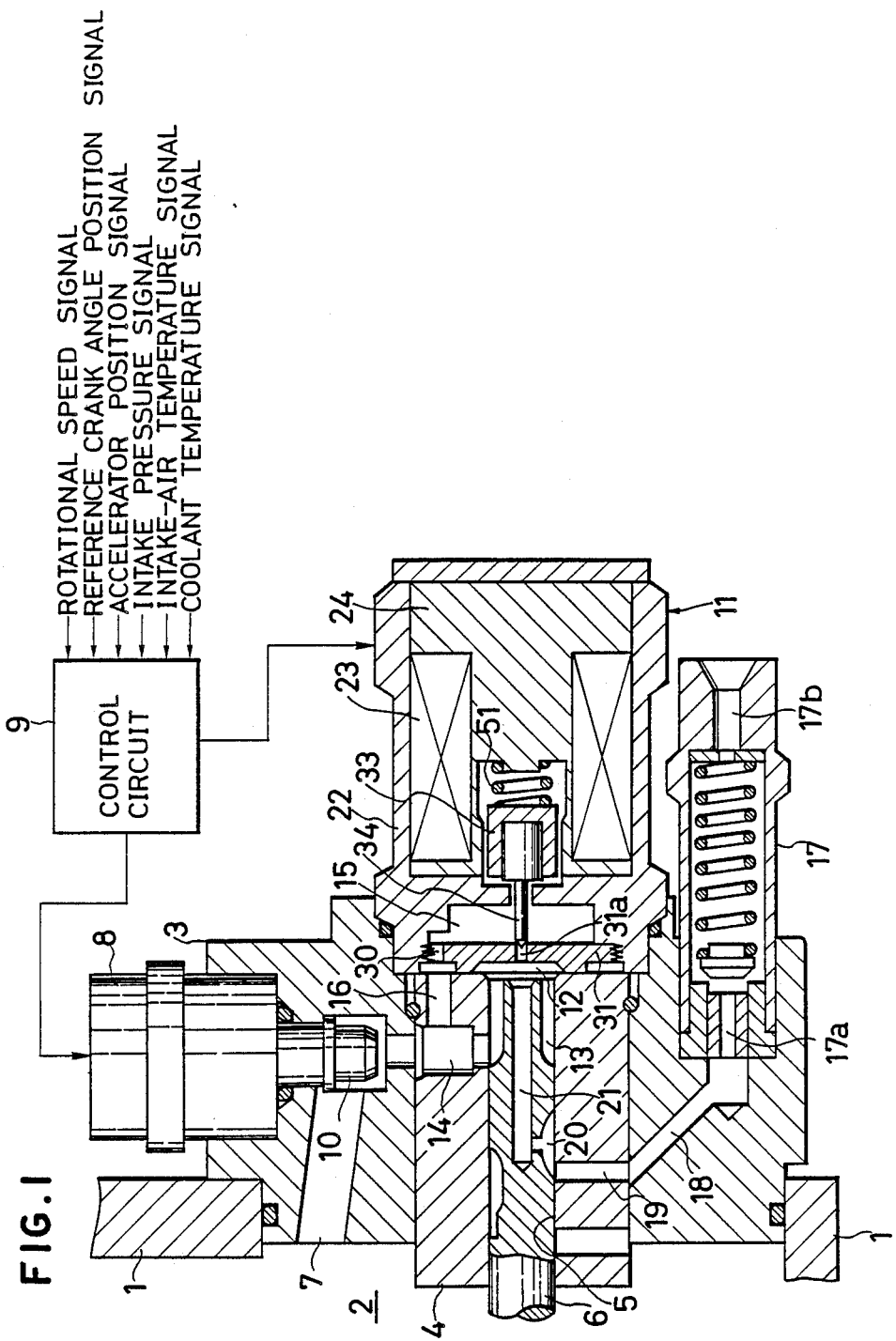
FIG. 1 is a longitudinal cross-sectional view of essential parts of a fuel injection pump to which the method of the present invention is applied.

FIG. 1 shows essential parts of a distributortype fuel injection pump for a diesel engine to which the present method is applied.

In this figure, reference numeral 1 indicates a pump housing of the distributor-type fuel injection pump. Mounted on the pump housing 1 is a feed pump (not shown) driven by a drive shaft (not shown) which is connected with an output shaft of an engine (not shown). The feed pump draws and pressurizes fuel from a fuel tank (not shown) and supplies the pressurized fuel to a suction space 2 (low pressure chamber) formed in the pump housing 1. The pressure within the suction space 2 is directly proportional to the rotational speed of the engine.

A housing block 3 is liquid-tightly mounted on the pump housing 1 and a plunger barrel 4 is liquid-tightly fitted in the housing block 3 with its axis aligned with that of the drive shaft. A plunger 6 for pressure distribution of fuel is received within a bore 5 of the plunger barrel 4 for concurrent rotative and reciprocating motion. A cam disc (not shown) is rigidly secured to one end (left end in FIG. 1) of the plunger 6, and coupled to the drive shaft for rotation in unison therewith. The cam disc has a camming surface urged by a plurality of rollers which are axially fixed in position and circumferentially held in a predetermined position by a roller holder (not shown). Accordingly, the plunger 6 is axially reciprocated while being rotated in accordance with the rotation of the drive shaft.

A fuel passage 7 is formed in the housing block 3 and communicates with the suction space 2. A solenoid valve 8 is mounted across the fuel passage 7 in the housing block 3 for blocking the fuel. The solenoid valve 8 is controlled by a control circuit 9, described below, so that the fuel passage 7 is selectively opened and closed by the valve body 10 thereof. Further, another solenoid valve 11 is fitted in the housing block 3 for controlling the overflow of fuel from a pressurizing chamber 12 to the suction space 2. The pressurizing chamber 12 (high pressure chamber) is defined by a washer 31 fitted in the solenoid valve 11, the plunger 6, and the plunger barrel 4. The pressurizing chamber 12 can communicate with a fuel introducing passage 14 formed in the plunger barrel 4 and the fuel passage 7 via slits 13 formed in a peripheral surface of a right end of the plunger 6 as viewed in FIG. 1 in circumferentially equally spaced relation and corresponding in number to the number of cylinders. Further, the solenoid valve 11 includes a return passage 15 provided therein, which communicates with the fuel introducing passage 14 via a communication passage 16 provided in the plunger barrel 14 and a relief port 30 formed in the washer 31.

Further, delivery valves 17 are provided in the housing block 3 which correspond in number to the number of the cylinders of the engine. The delivery valves 17 each have an inlet port 17a disposed to communicate with the pressurizing chamber 12 via respective fuel distributing passages 18 formed in the housing block 3, respective fuel distributing passages 19 formed in the plunger 4, a distributing port 20 formed in a outer peripheral surface of the plunger 6, and a central hole 21 formed along the axis of the plunger 6. The plural delivery valves 17 have outlet ports 17b connected with injection nozzles (not shown) of respective cylinders via respective injection pipes (not shown).

The solenoid valve 11 further includes a valve housing 22 which has the return passage 15 formed therein, and an iron core 24 having a coil 23 wound therearound. The washer 31 having the relief port 31 formed therein is threadedly fitted in the valve housing 22 at an end thereof facing the plunger 6.

The washer 31 has a central hole 31a formed along its axis and communicating between the pressurizing chamber 12 and the return passage 15. A needle valve 34, which is movable in unison with a moving member 33 driven by an electromagnet formed by the coil 23 and the iron core 24, is arranged to open and close the central hole 31a. When the coil 23 is deenergized, the needle valve 34 is seated in the central hole 31a by the urging force of a spring 51, whereby communication between the pressurizing chamber 12 and the return passage 15 is cut off. When the coil 23 is energized, the needle valve 34 is shifted rightward as viewed in FIG. 1 by the electromagnet. This causes the central hole 31a to open and the pressurized fuel is allowed to overflow into the return passage 15.

The coil 23 is controlled to be selectively energized and deenergized by the control circuit 9. The control circuit 9 is supplied with various input signals, such as an engine speed signal and a reference crank angle position signal obtained from an electromagnetic pickup (not shown) provided on the crankshaft of the engine, an accelerator position signal obtained from an accelerator position sensor (not shown), an intake pressure signal indicative of engine intake pressure and an intake-air temperature signal indicative of intake-air temperature respectively obtained from an intake pressure sensor and an intake-air temperature sensor (neither of which is shown) mounted in an intake pipe (not shown) of the engine, and a coolant temperature signal indicative of the temperature of engine coolant obtained from a coolant temperature sensor (not shown) mounted inside a water jacket (not shown) of the engine.

The control circuit 9 comprises a central processing unit (CPU), a read-only memory (ROM) in which an injection control program, described in detail below, etc., is stored, and a random-access memory (RAM). The control circuit 9 sends control signals to the solenoid valve 8 for blocking fuel supply as well as to the solenoid valve 11 for controlling the overflow of fuel depending on the above-mentioned input signals whereby the control of fuel injection periods or amounts of fuel injected, fuel injection starting times, etc. is carried out.

The operation of the distributor-type fuel injection pump having the above-described construction will be described below.

The plunger 6 makes concurrent rotative and reciprocating motion together with rotation of the drive shaft. During the suction stroke of the plunger 6 (the stroke in which the plunger 6 is moved leftward in FIG. 1), the solenoid valve 8 is opened by a control signal sent from the control circuit 9 to thereby open the fuel passage 7. As a suction slit 13 corresponding to one of the cylinders meets the fuel introducing passage 14 at a predetermined rotational angular position of the plunger 6, fuel is drawn from the suction space 2 into the pressurizing chamber 12 via fuel passage 7, fuel introducing passage 14 and suction slit 13 in the mentioned order.

During the pressurizing and delivery stroke of the plunger 6 (the stroke in which the plunger 6 is moved rightward in FIG. 1), as long as the solenoid valve 11 is deenergized and accordingly the spring 51 biases the needle valve 34 of the solenoid valve 11 in the leftward direction to keep the needle valve 34 blocking the central hole 31a, the fuel is pressurized in the pressurizing chamber 12. When the distributing port 20 meets one of the fuel distributing passages 19 corresponding to one of the cylinders at a predetermined rotational angular position of the plunger 6, the fuel pressurized in the pressurizing chamber 12 is supplied to one of the delivery valves 17 via the central hole 21, distributing port 20, corresponding one of the fuel distributing passages 19, 18 in the mentioned order, and further supplied via the delivery valve 17 and corresponding one of the injection pipes (not shown) to the injection nozzle (not shown) of corresponding one of the cylinders. During this pressurizing and delivery stroke, when the solenoid valve 11 is energized so that the needle valve 34 is shifted rightward in FIG. 1, the pressurizing chamber 12 is communicated with the return passage 15 on the low pressure side whereby the pressure in the pressurizing chamber 12 drops to stop the supply of fuel to the injection nozzle.

Figure 2:
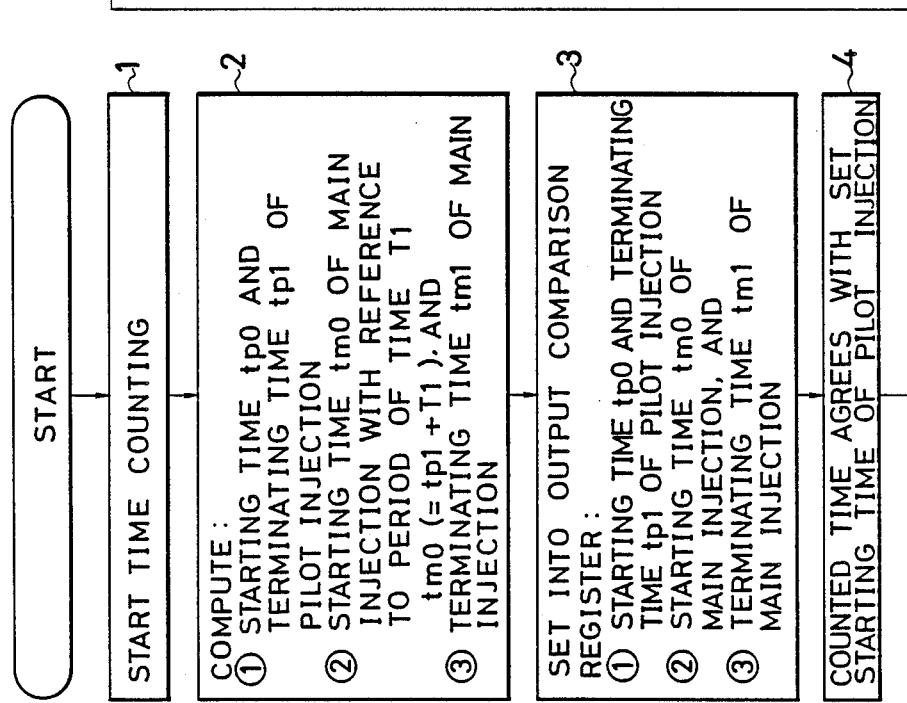
FIG. 2 is a flowchart illustrating one embodiment of the fuel injection control method of the present invention.

The control of fuel injection by selectively opening and closing the solenoid valve 11 for controlling the overflow of fuel is carried out in a manner shown in the flow chart of FIG. 2.

First, when the program shown in the flow chart is started upon inputting of a predetermined interrupt signal, time counting is started by a time counter provided within the control circuit 9 (step 1). With reference to the starting time of the time counting, starting time of pilot injection $tp_0$ and terminating time of the same $tp_1$ are determined. On the basis of a predetermined period of time $T_1$ from the terminating time of pilot injection $tp_1$ to the starting time of main injection $tm_0$, the starting time of main injection $tm_0$ is computed by the use of an equation $tm_0 = tp_1 + T_1$, and then the terminating time of main injection $tm_1$ is computed (step 2). These computed time values ($tp_0$, $tp_1$, $tm_0$, and $tm_1$) are set into an output comparison register within the control circuit 9 (step 3). The starting time and terminating time of the pilot injection $tp_0$ and $tp_1$ are computed with reference to the optimum quantity of fuel for pilot injection $Qp$ which is determined in terms of a period of duration of pilot injection $Tp$ read from data stored in the ROM and depending on signals representing operating conditions of the engine which are inputted to the control circuit 9, such as those representing engine rotational speed, the position of accelerator representative of engine load, the temperature of the engine, etc. ($tp_1 = tp_0 + Tp$). The predetermined time period $T_1$ between the terminating time of pilot injection $tp_1$ and the starting time of main injection $tm_0$ is computed as a predetermined value depending on signals representing operating conditions of the engine, or as a constant value irrespective of the signals. The predetermined time period $T_1$ is preferably set at such a value as to compensate for the time lag from a point of time of injection of fuel into a cylinder to a point of time of fuel being atomized and fired. The starting time of main injection $tm_0$ is determined as a point of time at which the predetermined time period $T_1$ elapses from the terminating time of pilot injection $tp_1$, i.e., $tm_0 = tp_1 + T_1$. The terminating time of main injection $tm_1$ is computed with reference to the starting time of main injection $tm_0$ and the optimum quantity of fuel for main injection $Qm$ which is determined in terms of a period of duration of main injection $Tm$. That is, it is computed by the use of an equation: $tm_1 = tm_0 + Tm$. The sum of the quantity of fuel for main injection $Qm$ and the quantity of fuel for pilot injection $Qp$ is an amount of fuel required per one cycle of the cylinder, and the optimum value of the sum to operating conditions of the engine is read from the ROM.

When the counted value of the time counter becomes in agreement with the starting time of pilot injection $tp_0$ which has been set in step 3 (step 4), the solenoid valve 11 is deenergized and closed to start pilot injection (step 5). Then, the counted value of the time counter becomes in agreement with the terminating time of pilot injection $tp_1$ which has been set in step 3 (step 6), the solenoid valve 11 is energized and opened to terminate pilot injection (step 7).

When the counted value of the time counter becomes in agreement with the starting time of main injection $tm_0$ which has been set in step 3 (step 8), i.e., the predetermined time period $T_1$ has elapsed from the terminating time of pilot injection $tp_1$, the solenoid valve 11 is deenergized and closed again to start main injection (step 9). When the counted value of the time counter becomes in agreement with the terminating time of main injection $tm_1$ which has been set in step 3 (step 10), the solenoid valve 11 is energized and opened to terminate main injection (step 11).

Figure 3:
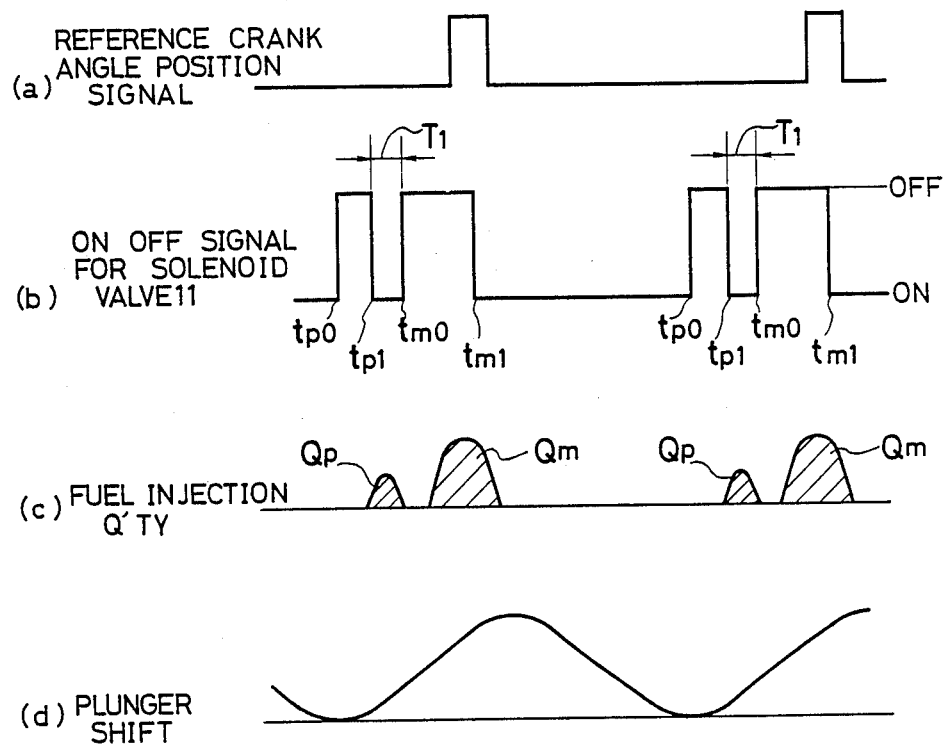

The control of fuel injection, i.e., the control of opening and closing the solenoid valve 11 will further be explained with reference to FIG. 3. The program shown in FIG. 2 is started by the predetermined interrupt signal. With reference to quantity of fuel for pilot injection $Qp$ ((c) in FIG. 3) determined according to operating conditions of the engine, the starting time $tp_0$ and terminating time $tp_1$ of pilot injection are set (as shown at (b) in FIG. 3).

Pilot injection is carried out in accordance with the set values $tp_0$ and $tp_1$. The starting time of main injection $tm_0$ is determined with reference to the terminating time of pilot injection $tp_1$ set as described above. That is, the time which is later than the terminating time of pilot injection $t_1$ by the predetermined time period $T_1$ is set as the starting time of main injection $tm_0$ ((b) in FIG. 3). Then, with reference to the quantity of fuel for main injection $Qm$ which is already determined as well as the determined time $tm_0$, the terminating time of main injection $tm_1$ is set.

The solenoid valve 11 is controlled in accordance with the timing values $tp_0$, $tp_1$, $tm_0$, $tm_1$ set as above. That is, at the terminating time of pilot injection $tp_1$, the solenoid valve 11 is opened to thereby terminate pilot injection, and then, at the starting time of main injection $tm_0$ when the predetermined period of time $T_1$ elapses from the terminating time of pilot injection $tp_1$, the solenoid valve 11 is closed to thereby start main injection. At the terminating time of main injection $tm_1$, the solenoid valve 11 is opened to thereby terminate main injection. Thus, according to the fuel injection control method of the invention, main injection is started upon elapse of a predetermined period of time after the terminating time of pilot injection, irrespective of the time of firing of the engine, thereby preventing the starting time of main injection from being varied due to varied times of firing of the engine as is the case with the conventional methods, and enabling a sufficient period of time for main injection to be secured so that the total amount of fuel for injection per one cycle is stably injected. Therefore, the injection controllability of a fuel injection pump having the function of pilot injection can be improved.

Although in the above-described embodiment, the fuel injection control method of the invention is applied to a distributor-type fuel injection pump, the invention is by no means limited thereto, and can be naturally applied to an in-line type fuel injection pump provided with a solenoid valve for overflow of fuel.

What is claimed is:

1. A fuel injection control method for a fuel injection pump having a high pressure chamber which is selectively communicable with fuel injection nozzles of an internal combustion engine, fuel being pressurized in said high pressure chamber and pressurized fuel being pressure delivered from said high pressure chamber to said fuel injection nozzles, a low pressure chamber, a communicating passageway connected to said high pressure chamber and said low pressure chamber, and a solenoid valve for selectively opening and closing said communicating passageway to selectively deliver pressurized fuel from said high pressure chamber to said fuel injection nozzles, and wherein while fuel is pressurized in said high pressure chamber, said solenoid valve is selectively opened and closed at determined timings so that pilot injection and subsequently main injection of fuel into said engine via said injection nozzles are carried out, the method comprising:
(1) determining a starting time and a terminating time of pilot injection depending on operation conditions of said engine;
(2) determining a first point of time at which a first period of time elapses from said terminating time of said pilot injection as a starting time of said main injection, said first period of time being set at a value depending upon operating conditions of said engine;
(3) determining a second point of time at which a second period of time elapses from said starting time of said main injection as a terminating time of said main injection, said second period of time being set independently of said first period of time; and
(4) driving said solenoid valve to selectively open and close said solenoid valve to thereby control fuel injection from said fuel injection nozzles, in accordance with (i) said starting time and terminating time of said pilot injection which are determined in step (1), and (ii) said starting time and terminating time of main injection which are determined respectively in steps (2) and (3).

2. The method of claim 1, comprising setting the sum of a period of duration of said pilot injection between said starting time and terminating time of said pilot injection and said second period of time at optimal values to operating conditions of the engine.

3. The method of claim 1, wherein said step (4) comprises:
opening said solenoid valve at said starting time of said pilot injection;
closing said solenoid valve at said terminating time of said pilot injection;
opening said solenoid valve at said starting time of said main injection; and
closing said solenoid valve at said terminating time of said main injection.

* * * * *